United States Patent
Hazlewood et al.

(10) Patent No.: US 7,937,360 B2
(45) Date of Patent: May 3, 2011

(54) TRANSFERRING MESSAGES TO A DIRECTORY

(75) Inventors: Kristin Marie Hazlewood, Austin, TX (US); Andy Hazlewood, Austin, TX (US); John Mark McConaughy, Austin, TX (US); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/036,665

(22) Filed: Feb. 25, 2008

(65) Prior Publication Data

US 2009/0216779 A1 Aug. 27, 2009

(51) Int. Cl.
*G06F 17/30* (2006.01)
(52) U.S. Cl. .................................... 707/607
(58) Field of Classification Search .......... 707/2, 101, 707/607; 715/511, 763
See application file for complete search history.

(56) References Cited

U.S. PATENT DOCUMENTS

| | | | | |
|---|---|---|---|---|
| 5,809,497 | A * | 9/1998 | Freund et al. .................... | 1/1 |
| 6,119,079 | A * | 9/2000 | Wang et al. ...................... | 704/8 |
| 6,490,619 | B1 * | 12/2002 | Byrne et al. .................. | 709/223 |
| 7,130,885 | B2 | 10/2006 | Chandra et al. | |
| 7,451,403 | B1 * | 11/2008 | Srinivasan et al. ............ | 715/763 |
| 2002/0120697 | A1 | 8/2002 | Generous et al. | |
| 2005/0249172 | A1 | 11/2005 | Malik | |
| 2007/0044011 | A1 * | 2/2007 | Cottrille et al. ............... | 715/511 |
| 2008/0104094 | A1 * | 5/2008 | Cowham et al. ............. | 707/101 |
| 2008/0140963 | A1 * | 6/2008 | Thomason et al. .......... | 711/162 |

* cited by examiner

*Primary Examiner* — Etienne P LeRoux
(74) *Attorney, Agent, or Firm* — Garg Law Firm, PLLC; Rakesh Garg; Jeffrey S. LaBaw (57) ABSTRACT

A method, system, and computer usable program product for transferring messages to a directory are provided in the illustrative embodiments. A listing of message templates that is stored in a computer usable storage medium is received. A list of messages is received. The listing of message templates is loaded in a directory. The directory executes in a data processing system and is configured to store messages. The list of messages are loaded in the directory. Messages are loaded in the directory by receiving a list of messages in the directory. A message is selected and identified from the list of messages. A determination is made if the message corresponds to an existing base message entry in the directory. A message instance entry is created in relation to the existing base message entry if the message corresponds to an existing base message entry and the message is otherwise handled if not.

20 Claims, 6 Drawing Sheets

TRANSFERRING MESSAGES TO A DIRECTORY

RELATED APPLICATION

The present invention is related to similar subject matter of and commonly assigned U.S. patent application Ser. No. 12/022,412 entitled "METHOD FOR STORING MESSAGES IN A DIRECTORY," filed on Jan. 30, 2008, which is hereby incorporated by reference.

BACKGROUND OF THE INVENTION

1. Field of the Invention

The present invention relates generally to an improved data processing system, and in particular, to a computer implemented method for managing data processing systems. Still more particularly, the present invention relates to a computer implemented method, system, and computer usable program code for transferring messages to a directory.

2. Description of the Related Art

Software applications generate informative messages as they execute in a data processing system. A message is textual information that may include alphanumeric text, special characters, and symbols. Data processing system hardware also generate similar messages during their operation. These messages may inform a user about conditions in the hardware or software environment. The messages may also alert a user about events that may require the user's attention. An event is the occurrence of a specific condition in the hardware or software environment. An event may be intended or unintended and may generate one or more messages.

Users, such as system administrators, often receive these messages in text form. Often, the text of the messages is also saved in a log file so that a user may access the messages in the future. Generally, these log files are flat files. A log file can grow in size during the course of operation of the hardware and software that write the messages in the log file. As a result, the log file can include several messages from several sources, mixed together in the chronological order in which the messages were generated.

Certain hardware and software may also use the messages written by other hardware and software. For example, a document editor software application may receive a message posted by a network interface card that the network link is non-operational. The software application may use this message, such as to display a warning to the user that the document may not be saved over the network.

In addition several data processing environments have multiple hardware and software systems logging messages to different log files. In such data processing environments, a user or application may have to access several files to retrieve the messages contained in each of those files. The user or application may then have to combine the messages retrieved from the various files, such as in a chronological order, usually manually, to understand the complete context of the messages.

Furthermore, the hardware and software that log the messages, log them in a predetermined language. For example, the messages are often logged in English. Occasionally, the messages may appear in alternate languages in the log files. In those cases, the hardware and software generating those messages are programmed to generate the messages in the alternate language.

SUMMARY OF THE INVENTION

The illustrative embodiments provide a method, system, and computer usable program product for transferring messages to a directory. A listing of message templates that is stored in a computer usable storage medium is received. A list of messages is received. The listing of message templates is loaded in a directory. The directory executes in a data processing system and is configured to store messages. The messages from the list of messages are loaded in the directory.

The directory is prepared for loading the messages by receiving a listing of message templates in the directory. A message template is parsed from the listing of message templates. A determination is made if an existing base message entry in the directory corresponds to the parsed message template. Entries in the directory are stored in a computer usable storage medium associated with the data processing system where the directory executes. A new base message entry corresponding to the parsed message template is added in the directory if the existing base message entry is not found. The existing base message entry is modified according to the parsed message template if the existing base message entry is found.

Messages are loaded in the directory by receiving, over a network, a list of messages in the directory. A message is selected from the list of messages. The message is identified A determination is made if the message corresponds to an existing base message entry in the directory. A message instance entry is created in relation to the existing base message entry if the message corresponds to an existing base message entry. The message is handled if the message does not correspond to an existing base message entry in the directory.

BRIEF DESCRIPTION OF THE DRAWINGS

The novel features believed characteristic of the invention are set forth in the appended claims The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Various components of a data processing environment, including hardware and software components, generate messages. These messages convey information to the users, such as system administrators. These messages are often logged in log files or otherwise stored in text for a user's review.

Illustrative embodiments recognize that messages generated and stored in this form are not conveniently searchable. For example, a log file containing thousands of messages is not conveniently searchable for similar content, similar timing, similar events, and many other criteria. Illustrative embodiments recognize that for searching beyond a simple text search, a user has to resort to a largely manual search process.

Illustrative embodiments further recognize that the messages stored in text form are generally stored in a predetermined language. In some instances, such as in Canada, messages may be logged in alternate languages, for example, in English and in French. Regardless, the designers of the software and hardware components predetermine the language of the messages, and program the language of the messages in the code of the software or hardware components.

Illustrative embodiments recognize that some users may prefer a language that is different from the language of the messages. For example, a system administrator in China managing a data processing environment in China may prefer to see the messages in Chinese instead of the messages in the default language—English. Users who prefer a different language than the language of the messages find it difficult to read, search, and analyze the messages.

The illustrative embodiments provide a method for transferring messages from a presently used log file or another comparable form of storing messages to a directory. The directory according to the illustrative embodiments is a directory, for example a directory server implementing the lightweight directory access protocol (LDAP), that is designed to store messages. A directory is a hierarchical arrangement of information pertaining to users and systems in an organization. A directory server is a server in a data processing environment that provides a directory service. A directory service is a process by which a user in the data processing environment can retrieve details of a user or system from a directory server by providing a name of the user or system.

Directory servers may serve directories that are arranged according to a standard. One such standard is LDAP, which specifies a particular way of hierarchically organizing user information in a directory. A directory may be implemented using a standard, a variation of the standard, or by using a proprietary hierarchy. For example, the illustrative embodiments may be implemented using an X.500 directory server, which implements a directory standard of that name. The illustrative embodiments may also be implemented using a name server, or a user location service server (ULS server).

The method, system, and computer usable program code of the illustrative embodiments may be implemented using any hierarchically organized directory. The illustrative embodiments exemplarily use LDAP directory server for the clarity of the description but are not limited to LDAP directory server based implementations.

The illustrative embodiments provide a user with capability to transfer messages generated by existing hardware and software applications to a directory. The illustrative embodiments provide this capability in a manner that the existing hardware and software applications that generate the messages need not be modified or disturbed. The existing hardware and software applications can continue generating messages in the manner their designers predetermined, and log those messages in the presently used log files or other comparable message storage. The illustrative embodiments capture these generated and stored messages and transfer them to a directory.

By enabling the transfer of the messages to a directory, the illustrative embodiments provide improved search and analysis capabilities that may solve problems related to storing, searching, understanding, and analyzing messages stored in log files. Upon transferring the messages from existing hardware and software applications to a directory according to the illustrative embodiments, the user can then retrieve the messages in any language of the user's choosing. In one example, storing messages in the manner of the illustrative embodiments may improve the response time to the events in a data processing environment due to the improved search and language capabilities that the illustrative embodiments provide. In another example, a user may be able to get a high level view of the messages, for example, a global view of the messages across an entire data processing environment, grouped according to user-selected criteria.

The advantages listed above are only exemplary and are not intended to be limiting on the illustrative embodiments. Additional advantages may be realized by specific illustrative embodiments. Furthermore, a particular illustrative embodiment may have some, all, or none of the advantages listed above.

Figure 1:
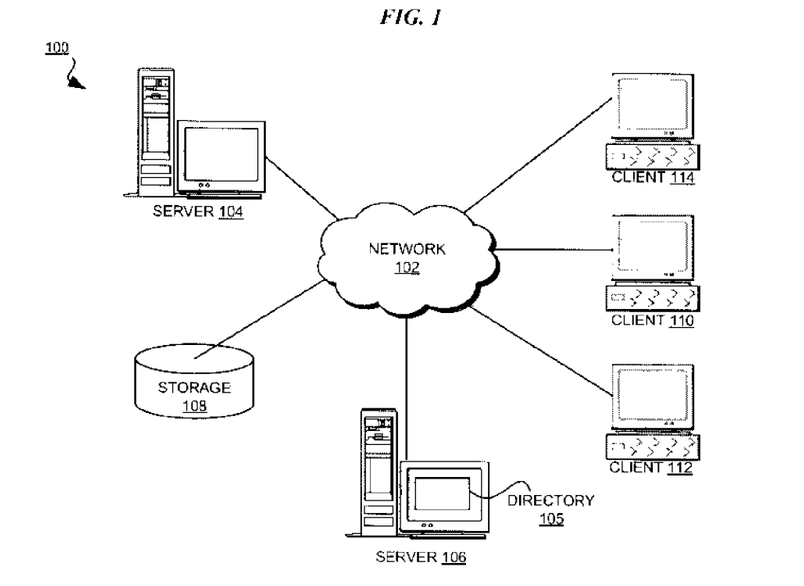
FIG. 1 depicts a pictorial representation of a network of data processing systems in which illustrative embodiments may be implemented.
Figure 2:
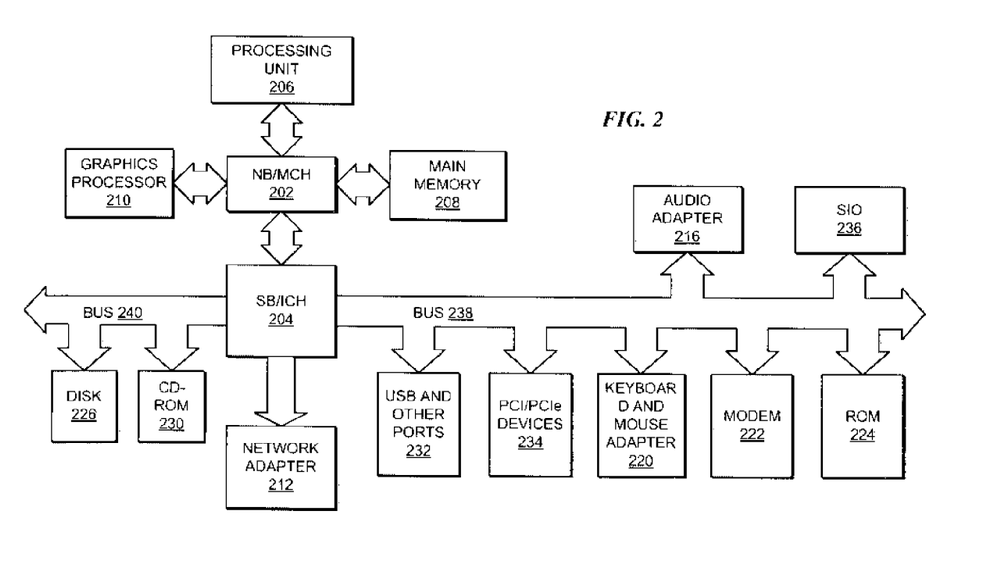
FIG. 2 depicts a block diagram of a data processing system in which illustrative embodiments may be implemented.

With reference to the figures and in particular with reference to FIGS. 1 and 2, these figures are exemplary diagrams of data processing environments in which illustrative embodiments may be implemented. FIGS. 1 and 2 are only exemplary and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Software applications may execute on any computer in data processing environment 100. In the depicted example, server 106 includes directory 105, which may be a software server application, executing on server 106. Server 104 and server 106 couple to network 102 along with storage unit 108. In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment. A client server environment enables software applications and data to be distributed across a network such that an application functions by using the interactivity between a client data processing system and a server data processing system.

The interactivity between the clients and the servers in a client server environment may include data communications pertaining to messages. Data processing systems in data processing environment 100 may detect events in data processing environment 100 and communicate messages to each other. For example, an application executing on server 104 may generate a message that may be stored in a log file in storage 108. The illustrative embodiments may transfer the messages from that log file to directory 105 executing on server 106.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Information is organized in a hierarchy in a directory, such as in directory 105 in FIG. 1. Nodes in the hierarchy have parent-child relationships with each other. The higher the level of a node in the hierarchy, the larger the group of information the node represents.

Each node has an identifier that identifies the level of that node. For example, identifier "c" may identify a node that represents company-wide information that is available by starting and traversing down the hierarchy from that node. Similarly, identifier "o" may identify nodes representing organization-wide information of organizations within the company of node with identifier "c". Identifier "ou" may identify nodes representing information pertaining to organization units under the organization of node having identifier "o", under the company of node having identifier "c". Identifier "l" of some nodes may indicate levels, such as levels of employees, within the organization unit of node with identifier "ou". Identifier "cn" of some nodes may indicate that those nodes represent the common names of individual employees at the level of node with identifier "l". Many levels of nodes may exist in a given hierarchy for organizing the information.

Data existing at any node of the hierarchy is an entry in a corresponding directory, and is uniquely identified by the entry's distinguished name (dn). Distinguished name is a representation of the path to that data in a hierarchy. For example, the information of user John Doe may reside at a node in the exemplary hierarchy described above. The distinguished name for John Doe's entry in such an exemplary directory may be, "cn=John Doe, l=Manager, ou=North America Sales, o=Sales, c=ABC Widgets Corp.".

The parent-child relationship between a parent node and a child node corresponds to parent-child relationship between corresponding entries. An entry corresponding to a parent node becomes a parent entry, and an entry corresponding to a child node becomes a child entry. The identifiers of the nodes and the parent-child relationships between the nodes can be altered to match a particular organization's structure. An LDAP directory can then be implemented based on the resulting hierarchy using LDAP server applications.

Figure 3:
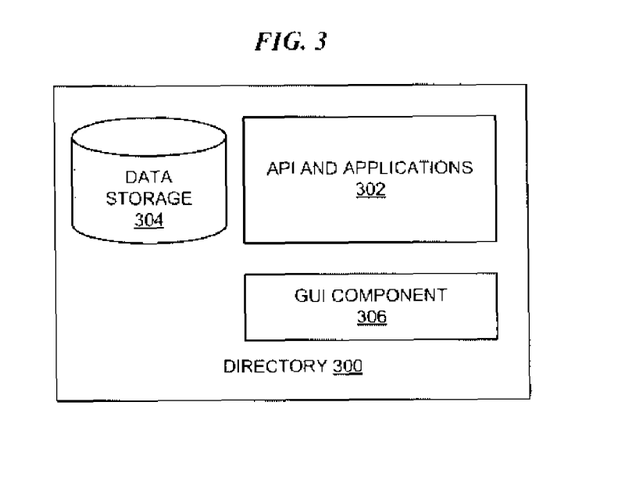
FIG. 3 depicts a block diagram of components of a directory in accordance with an illustrative embodiment.

With reference to FIG. 3, this figure depicts a block diagram of components of a directory in accordance with an illustrative embodiment. Directory 300 may be implemented as directory 105 in FIG. 1. Directory 300 may implement one or more hierarchies for organizing the information in the manner described above.

Directory 300 may include application programming interfaces (API) and applications that are presently available with directories. API and applications 302 may be such APIs and applications. Directory 300 may store the directory information in data storage 304. Data storage 304 may store the directory information in any suitable form. For example, data storage 304 may store the directory information as a rational database, an object oriented database, a flat file, or an index file.

Directory 300 may also include graphical user interface (GUI) component 306. Graphical user interface component 306 may provide a user a graphical method for accessing the messages stored in the directory For example the user may user graphical user interface component 306 to create search queries, select queries from pre-formed search queries for common searches. The user may also be able to organize, rearrange, or further process the entries that result from the search, using graphical user interface component 306. The depicted components of directory 300 may take additional forms and support additional or different functions in particular implementations without departing from the scope of the illustrative embodiments.

Messages may be organized in a hierarchy in a directory in accordance with the illustrative embodiments. Hierarchy of messages according to the illustrative embodiments may be integrated into an existing hierarchy at any level of the existing hierarchy. Alternatively, a directory may implement a separate hierarchy for the messages or groups of messages.

Figure 4:
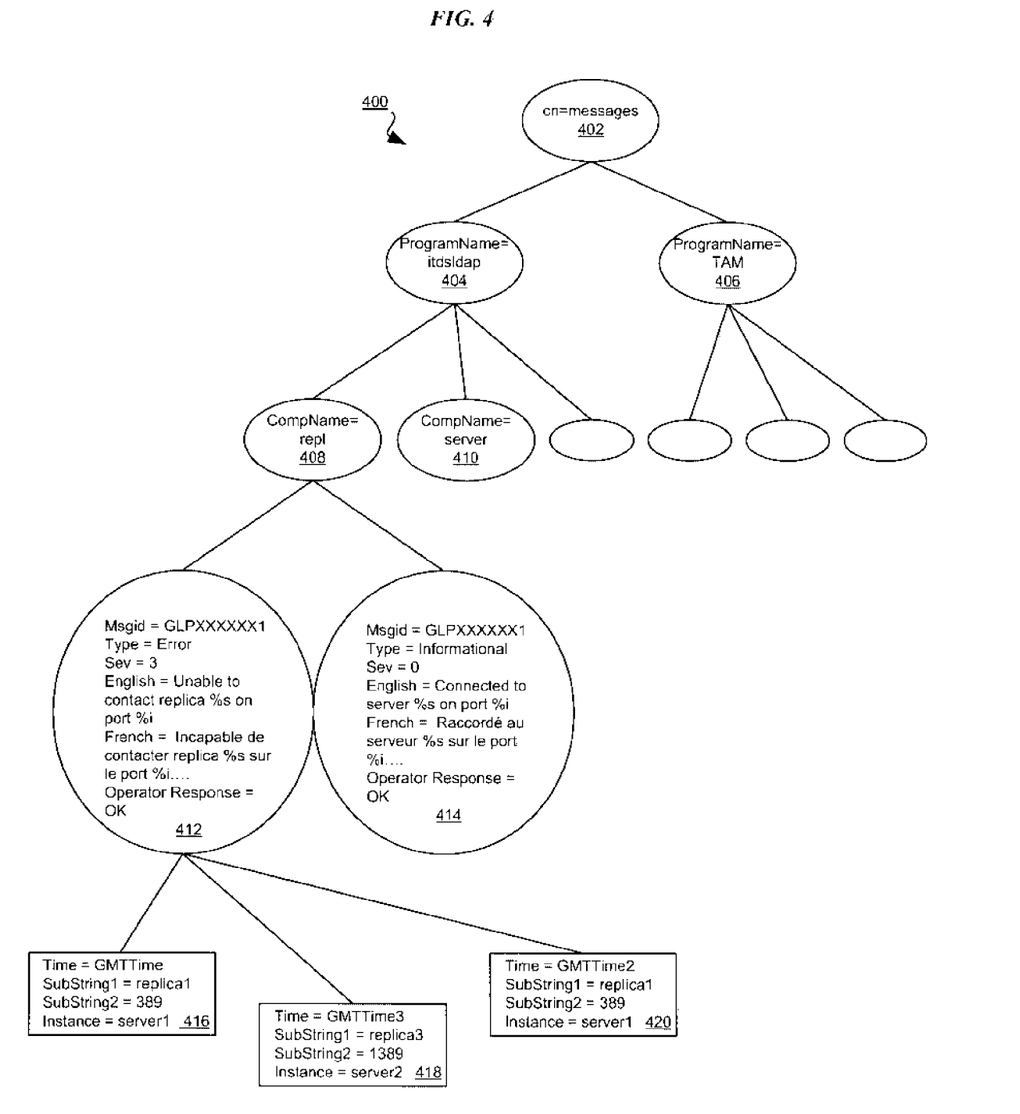
FIG. 4 a block diagram of a message hierarchy including exemplary message instances in accordance with an illustrative embodiment.

With reference to FIG. 4, this figure depicts a block diagram of a message hierarchy including exemplary message instances in accordance with an illustrative embodiment. Hierarchy 400 may be implemented in a directory such as directory 300 in FIG. 3.

Hierarchy 400 depicts exemplary message instances stored in a message hierarchy. For example, node 402 with identifier "cn" may represent class name. One exemplary class name may be "messages", as in node 402. The hierarchy below node 402 may represent the organization of messages in the directory implementing hierarchy 400. As an example, node 402 is shown to have nodes 404 and 406 with identifier "ProgramName" as children nodes. "ProgramName" nodes 404 and 406 may represent the various applications, or software programs, whose messages may be stored in the directory. Children nodes of "ProgramName" nodes may represent further sub grouping of messages, such as by the specific components of the various applications, such as nodes 408 and 410. Similarly, other nodes and levels may be added to a hierarchy to represent further sub grouping of messages, such as by specific servers on which specific instances of specific components may be executing and generating messages. Such additional levels are not depicted in FIG. 4 but are contemplated within the scope of the illustrative embodiments.

Nodes 412 and 414 are base message nodes. A base message node including a base message may exist at any level in the hierarchy of message information. A base message is a shell of a message that represents a group of messages. A single base message may represent many individual messages by including the features that are common to those individual messages. A node representing a base message is a base message node, and an entry corresponding to the base message node is a base message entry.

Nodes 416, 418, and 420 are message instance nodes. An individual message is also known as a message instance, a node corresponding to a message instance is a message instance node, and an entry corresponding to the message instance node is a message instance entry. For example, two message instances may read, "Error connecting to port 12", and "Error connecting to port 15". A base message for the two message instances may read, "Error connecting to port % i" where % i can be substituted with the exact port number to create each individual message.

Substituting parts of the base message in this manner results in the message instances that the base message represents. The value that replaces or substitutes a part of a base message is called a substitution string. A set of substitution strings is one or more substitution strings. In the above example, "12" substitutes "% i" to create the first message. Similarly, "15" substitutes "% i" to create the second message. Values "12" and "15" are examples of substitution strings.

A base message may also include one or more language options. A language option is the availability of a copy the contents of the base message in a particular language. A base message translated in a particular language is called a translation of the base message, or simply, a translation. For example, the base message of a particular base message node may include two language options—English and French. In the corresponding base message entry, an identifier "English" may store the English version of the base message, and an identifier "French" may store the French translation of the base message.

A language option may be specified in the distinguished name just as any other identifier described above. If a user includes the "French" identifier in a distinguished name to find a message under the exemplary base message entry, the directory will deliver the French version of the base message with appropriate substitution strings. For example, a software application may have generated a message "Unable to contact replica 1 on port 389". A directory may store that message by creating entries corresponding to message instance node 416 under base message node 412.

Assuming as an example that the directory is an LDAP directory, if a user made a search request for that message, but wanted that message in French, the user may use the identifier "French" as "objectclass=*French" in searching for that message. The string "objectclass=*" acts as a filter. The string "French" is the requested attribute of the entry that corresponds to the message for which the user is performing the search. A filter is a criterion such that when the criterion in an entry has a value equal to the requested attribute, the filter delivers the entry in the result; otherwise, the filter omits the entry.

A search request is a request for searching the directory according to a set of search parameters. A search parameter is a criterion to be used in performing the search. For example, a search parameter may be a time of generating of the message, which may cause the search to return zero or more messages that match the time specified in the search parameter. As another example, a search parameter may specify a source of a message so that the search may return all messages generated by that source hardware or software.

A set of search parameters is one or more search parameters. A requested attribute in an LDAP directory is an example of a search parameter. Here, requested attribute "French" is a search parameter identifying a language.

In response to the user's exemplary search request above, a directory implementing the exemplary hierarchy may return "Incapable de contacter replica 1 sur le port 389". In so returning, the directory uses the substitution strings of the entry corresponding to node 416 to substitute designated parts of the French base message in the entry corresponding to base message node 412. Thus, a user can retrieve a French translation of a message from the directory even if a software application is not designed to generate the messages in French. Of course, the user may also receive other attributes from the returned entries depending on the search request.

A user, such as a system administrator, may add additional identifiers to any nodes as additional features are desired from a directory. Presently, methods exist for adding, deleting, or modifying identifiers in a directory's hierarchy. For example, a user can use an "ldif" stored file to modify identifiers in an LDAP directory.

Using existing methods, a user can modify the identifiers in the entries of a directory. For example, the user can add additional language identifiers, such as "Japanese" at the base message entries. The user can then store the base message text translated in those languages in those entries. The directory is then able to provide a Japanese version of the messages stored under those base message entries without any change to the software application that generated those messages.

As an example, assume that hierarchy 400 is implemented in an LDAP directory. When a user searches for all the error messages from the program "itdsldap", the user may specify a distinguished name according to the LDAP convention. For example, the distinguished name for searching for the error message would be "ldapsearch-b CompName=repl , ProgramName=itdsldap, cn=messages". The contents of all the children nodes of each of base message nodes 412 and 414 are combined with the contents of the respective base message nodes to recreate all the stored messages from the software application "itdsldap".

As another example, a user may search for a specific error message from the program "itdsldap". For example, the user may want to search for the error message described above. The user may specify a distinguished name according to the LDAP convention to search for this particular message. For example, the distinguished name for searching for the error message would be "ldapsearch-b CompName=rep1, ProgramName=itdsldap, cn=messages, MsgId=GLPxxx1".

The contents of message instance nodes 416, 418, and 420 are combined with the contents of base message node 412 to recreate all the stored error messages. For example, in one embodiment, the directory may return the error messages sorted by timestamps of each message because the directory stores the "Time" identifier in this exemplary hierarchy. In another embodiment, the directory may return all the messages in French if the user has also specified the filter and requested attribute "objectclass=*French". In another embodiment, the directory may return other translations if available in response to the user specifying different languages in the distinguished name. In another embodiment, the directory may return only the error messages that originated from server1, sorted in chronological order, in French language.

In another example, an illustrative embodiment may make a software application aware that the messages are going to be stored in a directory, where the software application is previously unaware of the directory. Consequently, the software application may not generate the entire message but only a set of substitution strings. For example, in accordance with the illustrative embodiment, the "repl" component of "itdsldap" application may generate a message that may resemble, "MsgId=GLPxxx1, Time=GMT, SubString1=replica1, SubString2=389, Instance=Server1". The directory may store the message instance as message instance node 416. A user queries the directory to find out if component "repl" has generated any error messages. The user may specify the distinguished name of the error messages the user is interested in as "ldapsearch-b CompName=repl, ProgramName=itdsldap, cn=messages, MsgId=GLPxxx1".

In one embodiment, the user may specify the various identifiers in any order in a distinguished name. In another embodiment, the user may specify alternate, additional, variant, or combined identifiers instead of those used in this example. In another embodiment, the user may specify an identifier by which to sort the resulting entries. In another embodiment, the user may specify a language in which to return the resulting entries.

Many other combinations of identifiers, and many other orders, selections, and languages of the entries will be conceivable from the description of the illustrative embodiments. For example, if an error in one program occurs at 10:00 AM, by using the illustrative embodiments the user can find out what other messages were generated at approximately that time.

Figure 5:
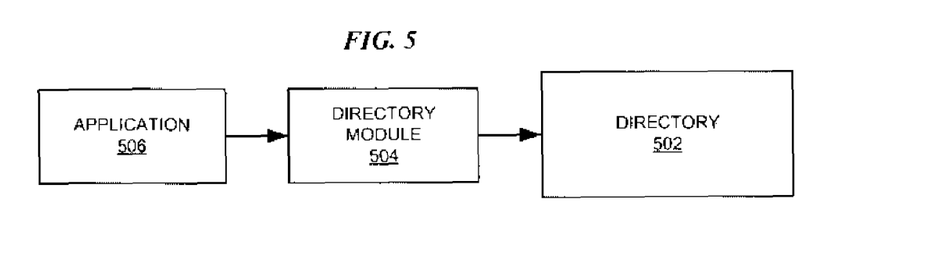
FIG. 5 depicts a block diagram of transferring messages to a directory in accordance with an illustrative embodiment.

With reference to FIG. 5, this figure depicts a block diagram of transferring messages to a directory in accordance with an illustrative embodiment. Directory 502 may be implemented using directory 300 in FIG. 3.

Directory module 504 may be an application that may execute on a data processing system including the data processing system on which application 506 may be executing. Application 506 may be hardware, software, or a combination thereof, and may generate messages. Directory module 504 may be implemented as a software application, a hardware component, or a combination thereof.

FIG. 5 schematically depicts the flow of messages in accordance with the illustrative embodiment. Application 506 may generate messages and stores them in a log file or other comparable form of message storage. Directory module 504 may read those messages from the log file or other storage and transmit them to directory 502, thereby transferring the messages to directory 502.

Directory module 504 may also prepare directory 502 for receiving the messages generated by application 506. For example, directory module 504 may assist directory 502 in creating a suitable hierarchy, including crating one or more base messages, for storing application 506's messages. Directory module 504 may also include features to modify an existing message hierarchy in directory 502, such as when the messages generated by application 506 change, or a new language translation has to be added for the existing messages. These features of directory module 504 are described with reference to FIG. 6.

In one embodiment, directory module 504 may be integrated with application 504, such as by application programming interface (API), remote procedure call (RPC) or other techniques. In another embodiment, directory module 504 may operate independent of application 506.

In addition, application 506 and directory module 504 may operate on a common data processing system, or on different data processing systems that may be interconnected over a data network. In one embodiment, application 506 and directory module 504 may operate on same or different client computers. In another embodiment, directory module 504 may execute on the same data processing system where directory 502 may be executing, such as on one or more server computers.

Figure 6:
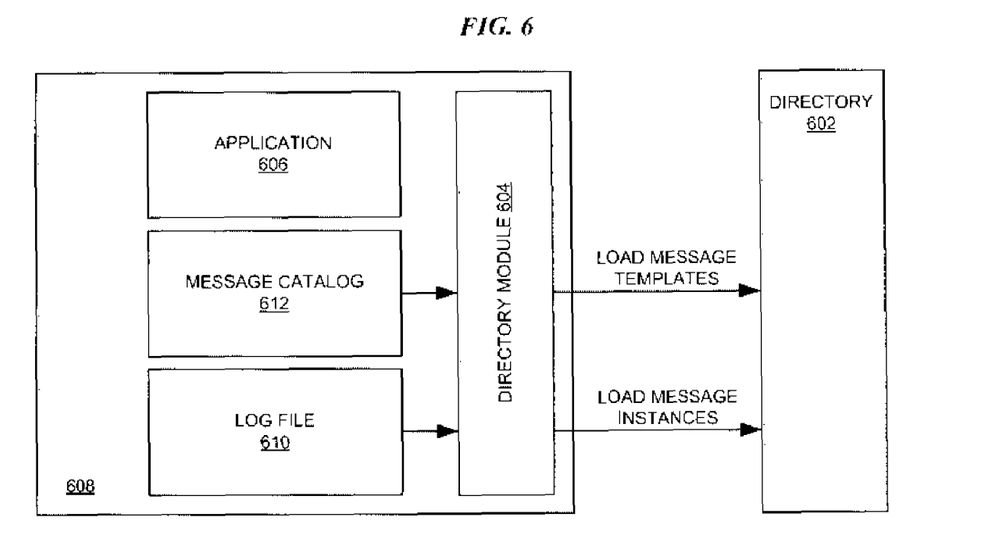
FIG. 6 depicts a block diagram of the interactions in transferring messages to a directory in accordance with an illustrative embodiment.

With reference to FIG. 6, this figure depicts a block diagram of the interactions in transferring messages to a directory in accordance with an illustrative embodiment. Directory 602 may be similar to directory 502 in FIG. 5. Directory module 604 may be similar to directory module 504 in FIG. 5. Application 606 may be similar to application 506 in FIG. 5. In the illustration of FIG. 6, directory module 604 and application 606 are depicted as exemplarily executing on a common data processing system, data processing system 608.

Application 606 generates messages that are stored in log file 610. Message catalog 612 is a listing of types of messages that application 606 may generate. An entry in message catalog 612 may describe a type of message, such as by specifying a message identifier, a text, and any substitution strings for that type of message. Such an entry in a message catalog is called a message template. For example, a message template in message catalog 612 may be, '2"The % 1$s file and the % 2$s file are same\n"'. "2" in this exemplary message template is the message identifier of a message corresponding to this message template. In an implementation of message catalog 612, the message identifier may be any string. "%1$s" and "%2$s" are two places in the message corresponding to this message template that may be replaced by substitution strings.

Message catalog 612 may also specify a language of the types of messages listed there in. For example, an implementation of message catalog 612 may specify that the messages listed therein are in English. Another implementation of message catalog 612 may specify that the messages listed therein are in French. Any number of message catalog 612 may exist in an implementation, and may specify common messages in different languages, or different messages in same or different languages.

Message catalog 612 may include many other pieces of information without departing from the scope of the illustrative embodiments. For example, an implementation of message catalog 612 may also specify grouping of messages with specific parameters being applicable to groups of messages. Furthermore, message catalog 612 may be a listing of types of messages in any form, and may follow any convention of creating message catalogs without departing from the scope of the illustrative embodiments. For example, in one embodiment, message catalog 612 may be a plain text file, such as with a ".txt" or ".doc" file extension. In another embodiment, message catalog 612 may be a catalog, such as with a ".cat" file extension. In another embodiment, message catalog 612 may be a spreadsheet, a database table, an index file, object code, pseudo code, or any other form of collecting information about types of messages.

Directory module 604 accepts message catalog 612 and loads the message templates from the message catalog 612 in directory 602. Directory module 604 accepts log file 610 and loads the messages contained therein as message instances in directory 602.

Directory module 604 may load the message templates and message instances by using certain functions of directory 602. Functions of directory 602 may be functions commonly provided in commercial directory servers, or may be added, such as by creating extended operations. An extended operation is code crated for executing against a directory for performing specific functions, including custom functions not supplied with a directory. Code for an extended operation may be created using tools and interfaces available with a directory. Alternatively, an extended operation may use the existing functions of a directory to perform new operations.

Here, "load message template" and "load message instances" operations may be exemplary extended operations that can be created for executing against an LDAP directory. An implementation may create these operations in any form and by any name suitable for that implementation without departing from the scope of the illustrative embodiments.

Figure 7:
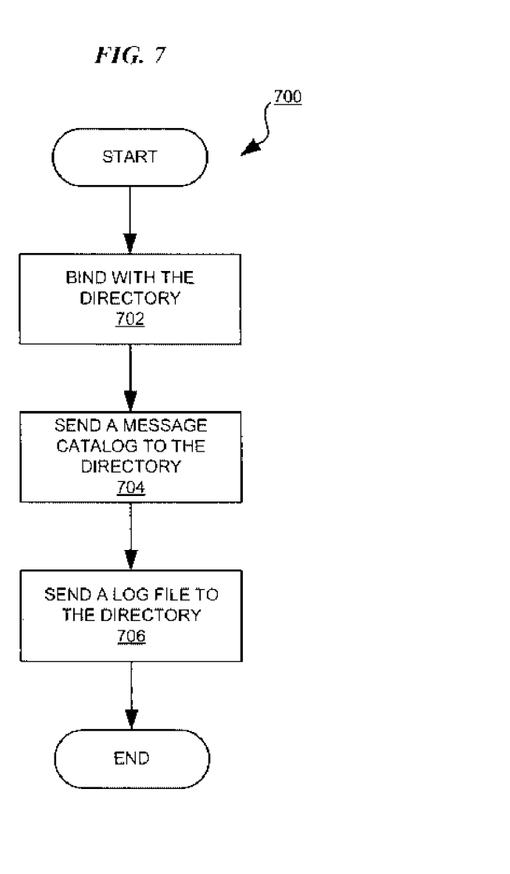
FIG. 7 depicts a flowchart of a process of transferring messages to a directory in accordance with an illustrative embodiment.

With reference to FIG. 7, this figure depicts a flowchart of a process of transferring messages to a directory in accordance with an illustrative embodiment. Process 700 may be implemented using directory module 604 in FIG. 6.

Process 700 begins by binding with a directory, such as directory 602 in FIG. 6, (step 702). Binding with a directory is the process of establishing communication with a directory whereby data can be exchanged with the directory. Note that in an implementation of process 700, step 702 may repeat any number of times for binding with any number of directories at a given time.

Process 700 sends a message catalog, such as message catalog 612 in FIG. 6, to the directory (step 704). In an implementation of process 700, step 704 may be repeated any number of times to send any number of message catalogs to the directory.

Process 700 sends a log file, such as log file 610 in FIG. 6, to the directory (step 706). Process 700 ends thereafter. In an implementation of process 700, step 706 may be repeated any number of times to send any number of log files to the directory. The message catalogs and log files may be sent to a directory in any order suitable for a particular implementation without departing from the scope of the illustrative embodiments. Additionally, step any of the steps 702, 704, and 706 may be omitted in a particular implementation of process 700. For example, step 704 may be omitted if a message catalog has already been sent and only a new log file is to be sent to a directory. As another example, step 706 may be omitted when only a message catalog is to be loaded in a directory and when a log file is not ready to be loaded in the directory. Step 702 may be omitted if the process has existing data connectivity available with a directory.

Furthermore, sending the message catalog may include sending one or more message templates at a time and sending an entire message catalog at a time, depending on the implementation of the "load message catalog" operation or its equivalent. Similarly, sending a log file may include sending one or more messages at a time and sending an entire log file at a time, depending on the implementation of the "load message instances" operation or its equivalent.

Figure 8:
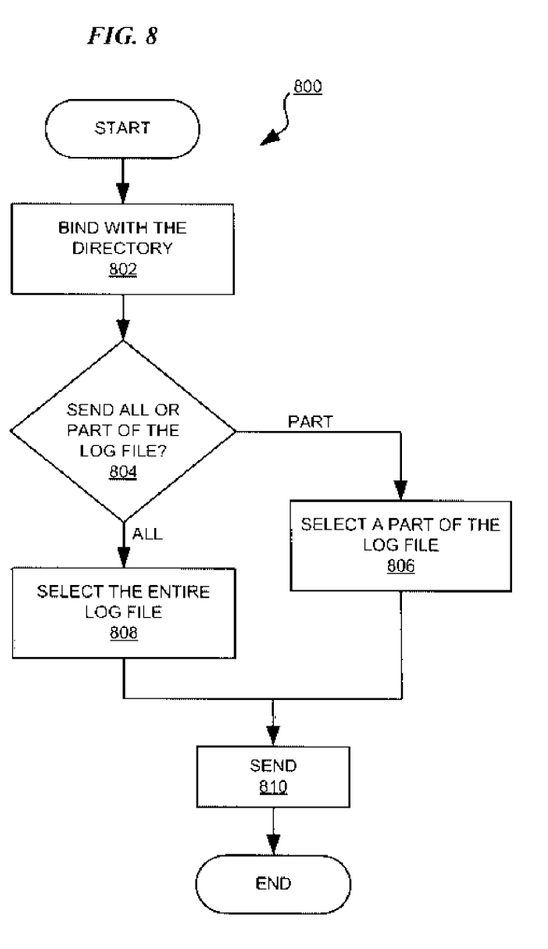
FIG. 8 depicts a flowchart of a process of sending messages from a log file to a directory in accordance with an illustrative embodiment.

With reference to FIG. 8, this figure depicts a flowchart of a process of sending messages from a log file to a directory in accordance with an illustrative embodiment. Process 800 may be implemented using directory module 604 in FIG. 6, as step 706 in FIG. 7.

Process 800 begins by binding with a directory (step 802). Step 802 may be omitted if data connectivity with a directory is already available. The process determines whether to send all or part of a log file to the directory (step 804). In some instances, a log file may include a number of messages above a threshold number such that the log file may have to be partitioned into several pieces such that a piece of the log file includes up to the threshold number of messages.

If process 800 determines that the log file has to be partitioned ("Part" path of step 804), process 800 partitions the log file according to the threshold number of messages and selects a part of the log file for sending to the directory (step 806). If process 800 determines that the entire log file can be sent ("All" path of step 804), the process select the entire log file for sending to the directory (Step 808). Process 800 then sends the entire log file or a part thereof, as may be the case, to the directory (step 810). Process 800 ends thereafter.

In one embodiment, process 800 may be implemented in an application that generates the messages, such as application 606 in FIG. 6. In another embodiment, process 800 may be implemented in an application separate from the application generating the messages and the directory module. For example, a separate software application may be responsible for monitoring the size of a log file and partitioning the log file into several log files each containing up to a threshold number of messages. Such separate software application may implement process 800 without departing from the scope of the illustrative embodiments.

Figure 9:
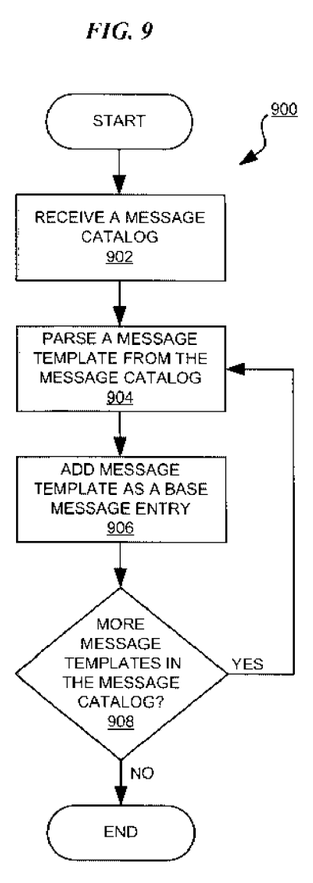
FIG. 9 depicts a process of receiving a message catalog into a directory in accordance with an illustrative embodiment.

With reference to FIG. 9, this figure depicts a process of receiving a message catalog into a directory in accordance with an illustrative embodiment. Process 900 may be implemented using directory 602 in FIG. 6.

Process 900 begins by receiving a message catalog (step 902). For example, the message catalog received in step 902 may be the message catalog sent in step 704 in FIG. 7. Process 900 parses a message template from the message catalog (Step 904). Process 900 adds the parsed message template as a base message entry in the directory (step 906).

Process 900 determines whether more message templates are present in the received message catalog (step 908). If more message templates are present in the message catalog ("Yes" path of step 908), process 900 returns to step 904. If no more message templates are present in the message catalog ("No" path of step 908), process 900 ends.

As an example, process 900 may be used in a directory for accepting a new message catalog, such as a message catalog from a new application whose messages are to be transferred to the directory.

Figure 10:
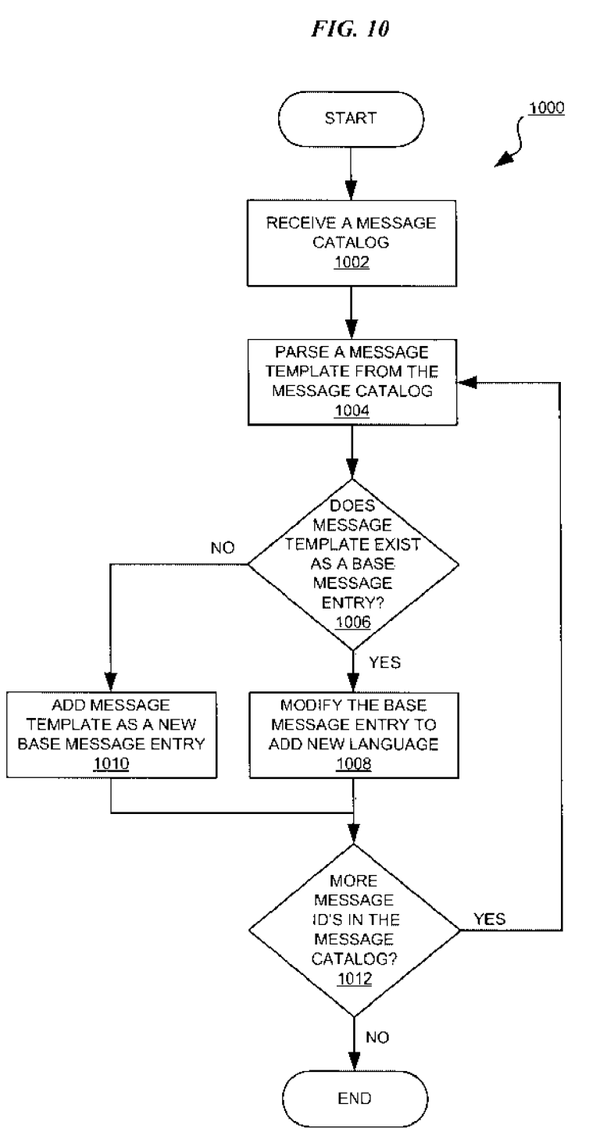
FIG. 10 depicts a flowchart of a process of modifying an organization of messages in a directory in accordance with an illustrative embodiment.

With reference to FIG. 10, this figure depicts a flowchart of a process of modifying an organization of messages in a directory in accordance with an illustrative embodiment. Process 1000 may be implemented using directory 602 in FIG. 6. As an example, process 1000 may be used for adding additional language translations of messages already existing in the directory.

Process 1000 begins by receiving a message catalog (step 1002). Process 1000 parses a message template from the message catalog (step 1004). Process 1000 determines whether the parsed message template already exists as a base message entry in the directory (step 1006).

If the parsed message template exists as a base message entry ("Yes" path of step 1006), process 1000 modifies the base message entry by adding the contents of the parsed message template to the existing base message entry (step 1008). For example, the parsed message template may be a new language translation of the base message already stored in the base message entry. Thus, in step 1008, process 1000 may modify the base message entry to include a new language translation according to the parsed message template.

If the parsed message template does not exist as a base message in the directory ("No" path of step 1006), process 1000 adds the message template as a new base message entry in the directory (step 1010). For example, in a particular implementation, an application that generates messages in multiple languages may generate more messages in one language as compared to the messages generated in another language. In such case, the message catalog may contain more message templates for messages in the first language as compared to a message catalog containing message templates for messages in the second language. When the second message catalog has already been loaded in the directory, the directory, while adding message templates from the first message catalog may find additional message templates in the first message catalog that do not exist as base message entries in the directory. Step 1010 allows the directory to add a language as a new base message entry in such circumstances.

Process 1000 determines whether more message templates are present in the message catalog received in step 1002 (step 1012). If more message templates are present ("Yes" path of step 1012), process 1000 returns to step 1004. If no more message template are present in the received message catalog ("No" path of step 1012), process 1000 ends.

Figure 11:
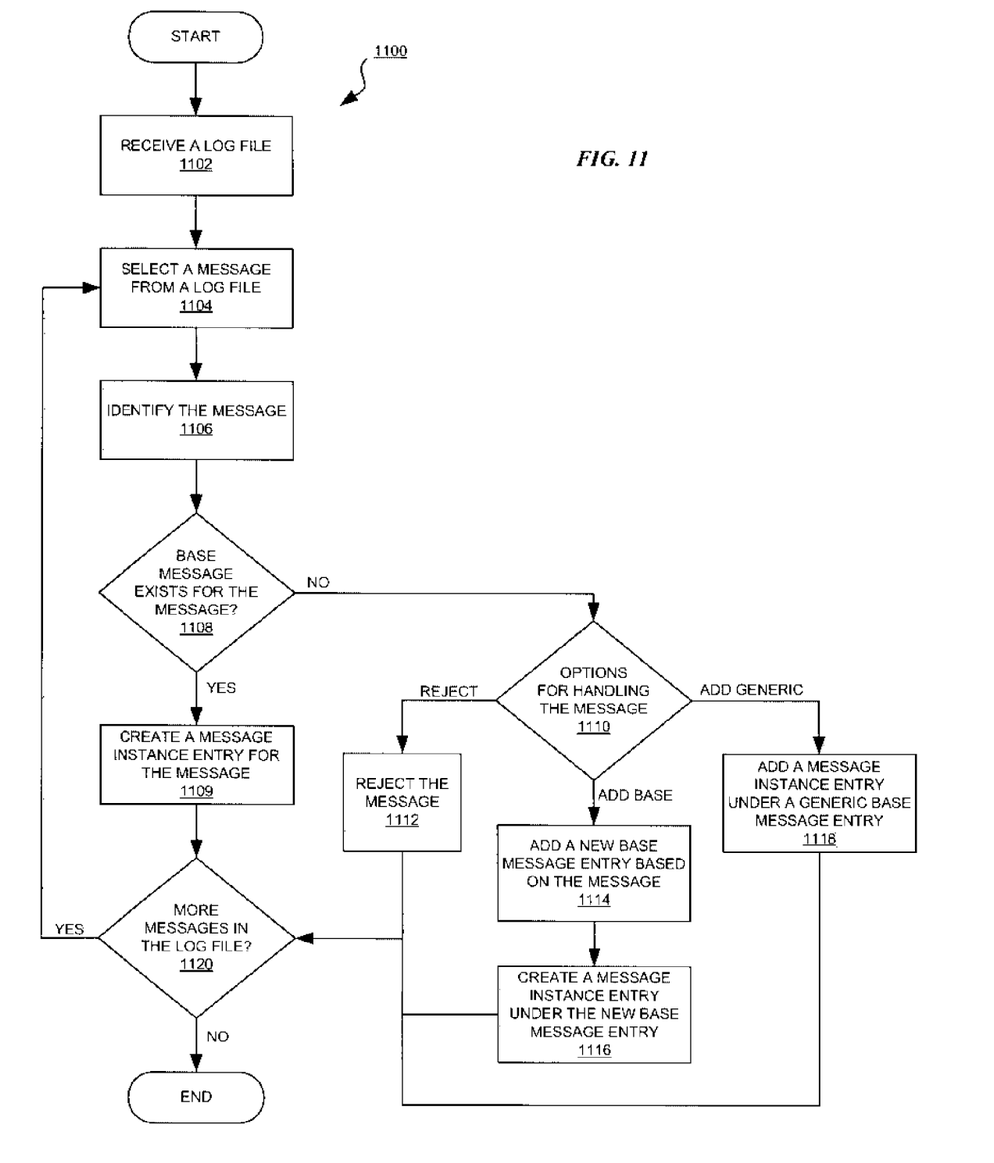
FIG. 11 depicts a flowchart of a process of adding messages to a directory in accordance with an illustrative embodiment.

With reference to FIG. 11, this figure depicts a flowchart of a process of adding messages to a directory in accordance with an illustrative embodiment. Process 1100 may be implemented using directory 602 in FIG. 6.

Process 1100 begins by receiving a log file of messages (step 1102). In one embodiment, process 1100 may receive one or more messages in a form other than a log file. In another embodiment, as described with respect to FIG. 8, process 1100 may receive all or part of a log file or equivalent thereof. In another embodiment, step 1102 may receive one message at a time, as a message is generated by an application with or without being recorded in a log file.

Process 1100 selects a message from the log file received in step 1102 (step 1104). Step 1104 may be modified depending on the form in which the messages are received in step 1102 as described above.

Process 1100 identifies the selected message (step 1106). A message may be identified in any manner suitable for a particular implementation. For example, a message may include a message identifier, which may be used for identifying the message. As another example, the text or content of the message may itself identify the message.

Process 1100 determines whether a base message entry exists for the identified message (step 1108). If the a base message entry exists corresponding to the identified message ("Yes" path of step 1108), process 1100 creates a message instance entry corresponding to the identified message in relation to the base message entry (Step 1109).

If a base message entry does not exist for the identified message ("No" path of step 1108), process 1100 may select from several options for handling the identified message (step 1110). Process 1100 may determine that a message whose base message does not exist in the directory is rejected ("Reject" path of step 1110). Following this determination, process 1100 may reject the message (Step 1112). Alternatively, process 1100 may determine that a new base message entry should be created for adding the identified message ("Add Base" path of step 1110). Following this determination, process 110 may add a new base message entry to the directory based on the identified message (step 1114). Process 1100 may then create a message instance for the identified message under the new base message entry (step 1116).

The directory may include a generic base message entry to act as a catch-all base message entry for accommodating messages whose base message entries are not found. Such a generic base message may be created in the directory at any time, including at the time of adding a message catalog, or at the time of adding a message whose base message entry does not exist.

As an option for handling the identified message from step 1106, process 1100 may determine that the identified message should be added to the generic base message entry ("Add Generic" path of step 1110). Following this determination, process 1100 may add a message instance of the identified message under the generic base message entry (step 1118).

Steps 1112, 1114, and 1118 are three exemplary optional ways in which an implementation of process 1100 may handle the message identified in step 1106. However, a particular implementation of process 1100 may implement all, some, or none of these exemplary options, or different options without departing from the scope of the illustrative embodiment.

Having handled the message, process 1100 determines whether more messages exist in the log file received in 1102 (step 1120). If more messages were received in step 1102 and remain to be processed ("Yes" path of step 1120), process 1100 returns to step 1104. If process 1100 determines that no more messages exist in the log file ("No" path of step 1120), process 1100 ends thereafter.

The components in the block diagrams and the steps in the flowcharts described above are described only as exemplary. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for transferring messages to a directory. By implementing the illustrative embodiments, users may transfer messages generated by hardware and software applications into a directory without having to modify those applications for using the directory for storing messages. The user can then search the directory in a more efficient way as compared to the traditional log file of messages.

The user can search for messages by specific criteria, such as the times of the messages, the sources of the messages, the nature of the messages, and any other criteria the user may desire. In addition, the user may retrieve the messages in a language of the user's choice from the directory, without having to modify the software and hardware that generated those messages.

The illustrative embodiments accept existing log files or equivalent thereof and transfer the messages contained therein to a directory, without disturbing the message generation process or the message storage process implemented in the various hardware and software applications. The illustrative embodiments may also accept message catalogs or other listing of types of messages that an application may generate to configure a directory for accepting the transferred messages.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for transferring messages, the method comprising:
   receiving a listing of message templates, the listing of message templates being stored in a computer usable storage medium;
   receiving a list of messages;
   loading the listing of message templates in a directory, the directory being served according to a directory access protocol by a directory server executing in a data processing system, the loading including parsing a message template from the listing of message templates to form a parsed message template and manipulating a base message entry in the directory, the base message entry including a plurality of language translations of the parsed message template; and
   loading a message from the list of messages in the directory as leaf node under the base message entry in a hierarchy of base message entries and leaf nodes in the directory such that a first part of the message corresponds to the base message entry and a second part of the message corresponds to the leaf node and the directory providing a translation of the message when the message is retrieved.

2. The method of claim 1, wherein the listing of message templates is a message catalog, and wherein the message catalog contains at least one message template.

3. The method of claim 1, wherein the list of messages is a log file, and wherein the log file contains at least one message.

4. The method of claim 1, wherein a message in the list of messages is generated by an application, and wherein the application is unaware of the directory.

5. The method of claim 1, wherein the list of messages is a portion of a log file.

6. The method of claim 1, wherein the list of messages is provided by an application without storing in a third computer-usable storage medium.

7. The method for claim 1, the manipulating further comprising:
   determining if an existing base message entry in the directory corresponds to the parsed message template, an entry in the directory being stored in a computer usable storage medium associated with the data processing system;
   adding a new base message entry corresponding to the parsed message template in the directory if the existing base message entry is not found; and
   modifying the existing base message entry according to the parsed message template if the existing base message entry is found.

8. The method of claim 7, wherein modifying the existing base message entry adds a new language translation of the base message to the base message entry.

9. The method of claim 7, further comprising:
   adding a generic base message entry in the directory.

10. The method of claim 1, further comprising:
    selecting a message from the list of messages;
    identifying the message;
    determining if the message corresponds to an existing base message entry in the directory, an entry in the directory being stored in a computer usable storage medium associated with the data processing system;
    creating a message instance entry in relation to the existing base message entry if the message corresponds to the existing base message entry; and
    handling the message, if the message does not correspond to the existing base message entry in the directory.

11. The method of claim 10, wherein handling the message includes at least one of rejecting the message, adding a new base message entry and a message instance entry corresponding to the message, and adding a message instance entry in relation to a generic base message entry.

12. A data processing system for transferring messages, the data processing system comprising:
    a storage device, wherein the storage device stores computer usable program code; and
    a processor, wherein the processor executes the computer usable program code, and wherein the computer usable program code comprises:
    computer usable code for receiving a listing of message templates;
    computer usable code for receiving a list of messages;
    computer usable code for loading the listing of message templates in a directory, the directory being served according to a directory access protocol by a directory server executing in the data processing system, the loading including parsing a message template from the listing of message templates to form a parsed message template and manipulating a base message entry in the directory, the base message entry including a plurality of language translations of the parsed message template; and
    computer usable code for loading a message from the list of messages in the directory as leaf node under the base message entry in a hierarchy of base message entries and leaf nodes in the directory such that a first part of the message corresponds to the base message entry and a second part of the message corresponds to the leaf node and the directory providing a translation of the message when the message is retrieved.

13. The data processing system of claim 12, wherein the listing of message templates is a message catalog, and wherein the message catalog contains at least one message template.

14. The data processing system of claim 12, wherein the list of messages is a log file, and wherein the log file contains at least one message.

15. The data processing system of claim 12, wherein a message in the list of messages is generated by an application, and wherein the application is unaware of the directory.

16. The data processing system of claim 12, wherein the computer usable code for loading the listing of message templates includes computer usable code for a first extended operation on the directory, wherein the computer usable code for the first extended operation, when executed, causes the data processing system to load in the directory one of a single message template and a plurality of message templates at a time.

17. The data processing system of claim 12, wherein the computer usable code for loading a message from the list of messages includes computer usable code for a second extended operation on the directory, wherein at the computer usable code for the second extended operation, when executed, causes the data processing system to load in the directory a plurality of messages at a time.

18. The data processing system of claim 12, wherein the list of messages is provided by an application without storing in a second computer-usable storage medium.

19. A computer usable program product comprising a computer usable medium including computer usable code for loading messages in a directory, the computer usable code comprising:

computer usable code for receiving, over a network, a list of messages in the directory, the directory being served according to a directory access protocol by a directory server, wherein the directory includes a base message entry including a plurality of language translations of a parsed message template;

computer usable code for selecting a message from the list of messages;

computer usable code for identifying the message;

computer usable code for determining whether the message corresponds to the base message entry in the directory;

computer usable code for creating a message instance entry under the base message entry if the message corresponds to the base message entry in a hierarchy of base message entries and message instance entries in the directory such that a first part of the message corresponds to the base message entry and a second part of the message corresponds to the message instance entry and the directory providing a translation of the message when the message is retrieved; and     computer usable code for handling the message, if the message does not correspond to the existing base message entry in the directory.

20. The computer usable program product of claim 19, wherein the computer usable code for handling the message includes at least one of computer usable code for rejecting the message, computer usable code for adding a new base message entry and a message instance entry corresponding to the message, and computer usable code for adding a message instance entry in relation to a generic base message entry.

* * * * *